US009690692B2

(12) United States Patent
Huang et al.

(10) Patent No.: US 9,690,692 B2
(45) Date of Patent: Jun. 27, 2017

(54) PRIORITY QUEUE HAVING ARRAY AND TREES

(71) Applicant: HEWLETT-PACKARD DEVELOPMENT COMPANY, L.P., Houston, TX (US)

(72) Inventors: Muhuan Huang, Palo Alto, CA (US); Kevin T. Lim, La Honda, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 322 days.

(21) Appl. No.: 14/529,993

(22) Filed: Oct. 31, 2014

(65) Prior Publication Data
US 2016/0125008 A1 May 5, 2016

(51) Int. Cl.
*G06F 17/30* (2006.01)
*G06F 12/02* (2006.01)

(52) U.S. Cl.
CPC ........ *G06F 12/02* (2013.01); *G06F 17/30961* (2013.01); *G06F 2212/20* (2013.01)

(58) Field of Classification Search
CPC combination set(s) only.
See application file for complete search history.

(56) References Cited

U.S. PATENT DOCUMENTS

| 2003/0058795 | A1 | 3/2003 | Lansing et al. | |
|---|---|---|---|---|
| 2007/0091797 | A1* | 4/2007 | Ma | H04L 12/5693 370/229 |
| 2010/0031366 | A1* | 2/2010 | Knight | G06Q 10/10 726/26 |
| 2011/0283059 | A1 | 11/2011 | Govindarajan et al. | |
| 2014/0006665 | A1* | 1/2014 | Amano | G06F 13/362 710/116 |

OTHER PUBLICATIONS

Huang, M. et al., "A Scalable, High-Performance Customized Priority Queue", Proceedings of the 24th International Conference on Field Programmable Logic and Applications (FPL 2014), Munich, Germany, Sep. 2-4, 2014, 9 pp.
Bhagwan, R. et al., Fast and scalable priority queue architecture for high-speed network switches, in INFOCOM 2000. Nineteenth Annual Joint Conference of the IEEE Computer and Communications Societies. Proceedings. IEEE, vol. 2. IEEE, 2000, pp. 538-547.
Graefe, G., "Implementing sorting in database systems," ACM Computing Surveys (CSUR), vol. 38, No. 3, article 10, 37 pp., Sep. 2006.
Ioannou, A. et al., "Pipelined heap (priority queue) management for advanced scheduling in high-speed networks," IEEE/ACM Transactions on Networking (ToN), vol. 15, No. 2, 5 pp., Apr. 2007.
Leiserson, C.E., "Systolic priority queues," Department of Computer Science, Carnegie-Mellon University, CMU, CS-79-115, Apr. 1979, 18 pp.

(Continued)

*Primary Examiner* — Shyue Jiunn Hwa
(74) *Attorney, Agent, or Firm* — Michael A. Dryja

(57) ABSTRACT

A replace operation is performed in relation to a priority queue. The priority queue has trees and elements. A first element stores a value having a greatest priority of any value stored in any element and in any tree. Each tree corresponds to one of the elements.

11 Claims, 8 Drawing Sheets

(56) References Cited

OTHER PUBLICATIONS

Moon, S.W., et al. "Scalable hardware priority queue architectures for high-speed packet switches," Computers, IEEE Transactions on, vol. 49, No. 11, pp. 1215-1227, Nov. 2000.
Martinez-Palau, X. et al., "Two-way Replacement Selection", Proceedings of the VLDB Endowment, vol. 3, No. 1, 2010, pp. 871-881.
Chetan, N.G., "Hardware-software architecture for priority queue management in real-time and embedded systems", Int. J. Embedded Systems, vol. 6, No. 4, 2014.
Agron, J. "FPGA Implementation of a Priority Scheduler Module", EECD Department University of Kansas technical paper, 2004,4 pp.
Rios, J. "An efficient FPGA priority queue implementation with application to the routing problem", Technical Report ucsc-crl-07-01, Department of Computer Engineering, University of Californa, Santa Cruz, May 9, 2007, 11 pp.
Agron Etal~ "FPGA Implementation of a Priority Scheduler Module" EECS Dept~ U of Kansas~ ITIC~ Sep. 10, 2004~ 4 pages.
Kumar Etal~ "Hardware-software architecture for priority queue management in real-time and embedded systems"~ Int. J. Embedded Systems v 6 #4~ 2014~ 16 pgs.
Rios ~ "An efficient FPGA priority queue implementation with application to the routing problem"~Technical Report Dept of Computer Engineering~UCSC May 9, 2007~11 pgs.
Ullman, "Computational Aspects of VLSI", Computer Science Press, 1984.

* cited by examiner

PRIORITY QUEUE HAVING ARRAY AND TREES

BACKGROUND

Queues are data structures used to store data in a particular order. One type of queue is a maximum priority queue, in which when a value is retrieved from the queue, the maximum value stored in the queue is provided. Another type of queue is a minimum priority queue, in which when a value is retrieved from the queue, the minimum value stored in the queue is provided. In both of these types of priority queues, for the purposes herein, it is said that the value having the greatest priority is provided when retrieved from the queue. In the case of a maximum priority queue, the value having the greatest priority is the highest value, and one value has a greater priority than another value if it is larger. In the case of a minimum priority queue, the value having the greatest priority is the lowest value, and one value has a greater priority than another value if it is smaller.

DETAILED DESCRIPTION

As noted in the background section, two types of queues include a maximum priority queue and a minimum priority queue, which are useful in such applications like databases. To provide for better performance, such queues may be implemented in dedicated, special-purpose hardware, such as a field programmable gate array (FPGA) device, as opposed to being implemented using a general-purpose processor and general-purpose random-access memory. However, FPGA devices have characteristics that can make implementation of such priority queues difficult.

For instance, implementing a priority queue using an FPGA device via an array, such as a register array, cannot be feasibly achieved for large-sized queues, even though in theory such an implementation has high performance. This is because the amount of logic circuitry that has to be included to implement a priority array increases with the size of the array. By comparison, implementing a priority queue using an FPGA device via a tree, such as a register tree or a block random-access memory (BRAM) tree, is feasible but in general the performance of a BRAM tree-implemented priority queue is less than desirable. Performance in this respect means how quickly operations can be performed in relation to the priority queue, such as a replace operation in which a value having the greatest priority in the queue is retrieved and a new value is placed in the priority queue in its place.

Techniques disclosed herein overcome these disadvantages in implementing a priority queue using an FPGA device in particular. Specifically, a hybrid priority queue is described herein that includes an array, such as a register array, and a number of trees, such as BRAM trees. The array has a number of elements, such as registers, which are ordered from a first element to a last element, and which each correspond to one of the trees. Each tree has nodes organized over a number of levels from a top level to a bottom level, where each level has a number of nodes greater than any preceding level. Logic effectuates a replace operation in relation to the trees and the array so that the first element stores the value that has the greatest priority of any value stored in any element and in any node of any tree.

A hybrid priority queue has performance comparable to an array-only priority queue and higher performance than a tree-only priority queue storing a same number of values (i.e., of the same size). Furthermore, the size of the array in a hybrid priority queue is smaller than the size of the array in an array-only priority queue, rendering it feasible for implementation via an FPGA device in particular. Furthermore, a tree is manipulated just when the greatest priority value stored in the tree has a greater priority than the value stored in its corresponding element. Indeed, just the tree corresponding to the first array element is manipulated.

Figure 1:
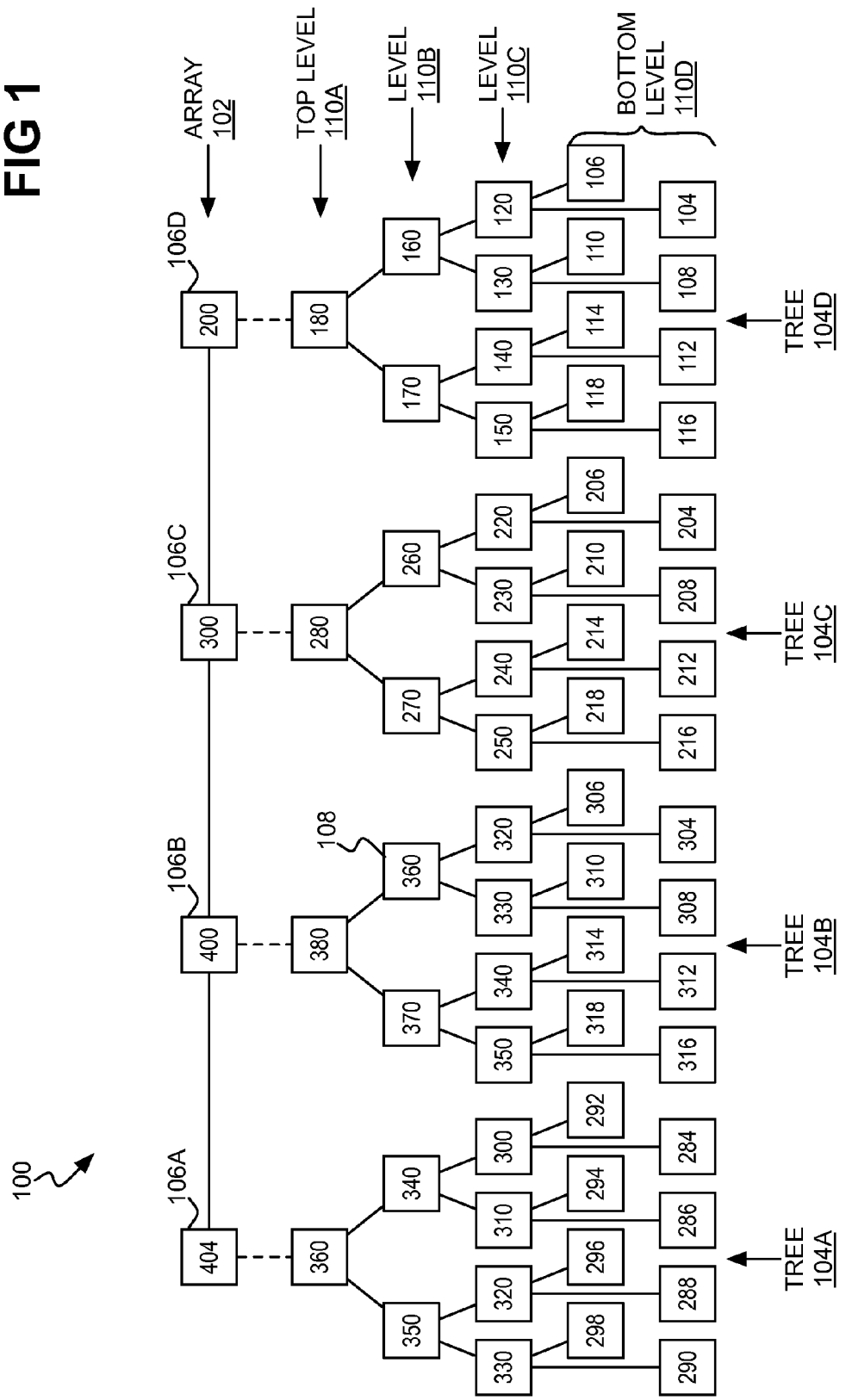
FIG. 1 is a diagram of an example hybrid priority queue.

FIG. 1 shows an example hybrid priority queue 100. The queue 100 includes an array 102 and trees 104A, 104B, 104C, and 104D, which are collectively referred to as the trees 104. The array 102 includes elements 106A, 106B, 106C, and 106D, which are collectively referred as to the elements 106. The elements 106 are ordered from the first element 106A to the last element 106D, such that the element 106B is the second element and the element 106C is the third element. Each element 106 corresponds to a tree 104. Specifically, the element 106A corresponds to the tree 104A, the element 106B corresponds to the tree 104B, the element 106C corresponds to the tree 104C, and the element 106D corresponds to the tree 104D.

The trees 104 include a number of nodes 108. Just one node 108 is called out in FIG. 1, in the tree 104B, for illustrative clarity. The nodes 108 of each tree 104 are organized over a number of levels 110A, 110B, 110C, and 110D, which are collectively referred to as the levels 110. While four levels 110 are shown in FIG. 1, there may be any number of levels greater than one. The level 110A is the top level, and the level 110D is the bottom level. The number of nodes 108 in a tree 104 at a given level 110 is greater than the number of nodes 108 in the tree 104 at any preceding level 110. In the example of FIG. 1, the top level 110A of each tree 104 includes one node 108, the level 110B of each tree 104 includes two nodes 108, the level 110C of each tree 104 includes four nodes 108, and the level 110D of each tree 104 includes eight nodes 108. In this example, each node 108 of each level 110 of each tree 104 except for the nodes 108 of the bottom level 110D has two children nodes in the immediately successive level 110.

Each element 106 of the array 102 and each node 108 of each tree 104 stores a value. Because there are four elements 106 in the array 102, and because there are fifteen nodes in each of four trees 104, the queue 100 of FIG. 1 can store sixty-four values. In different implementations, there may be different numbers of elements 106 in the array 102 and different number of nodes 108 in each tree 104. The number within each element 106 and within each node 108 is the value stored by that element 106 or node 108, examples of which are shown in FIG. 1 for a maximum priority queue 100 at steady state. At steady state, the first element 106A stores the value having a greatest priority of any value stored in any element 106 and in any node 108 of any tree 104. At steady state, each element 106 stores a value that has a greater priority than any value stored in any node 108 of the corresponding tree 104. At steady state, each node 108 of each tree 104 stores a value that has a greater priority than any value stored in any child node 108 of that node 108.

Figure 2:
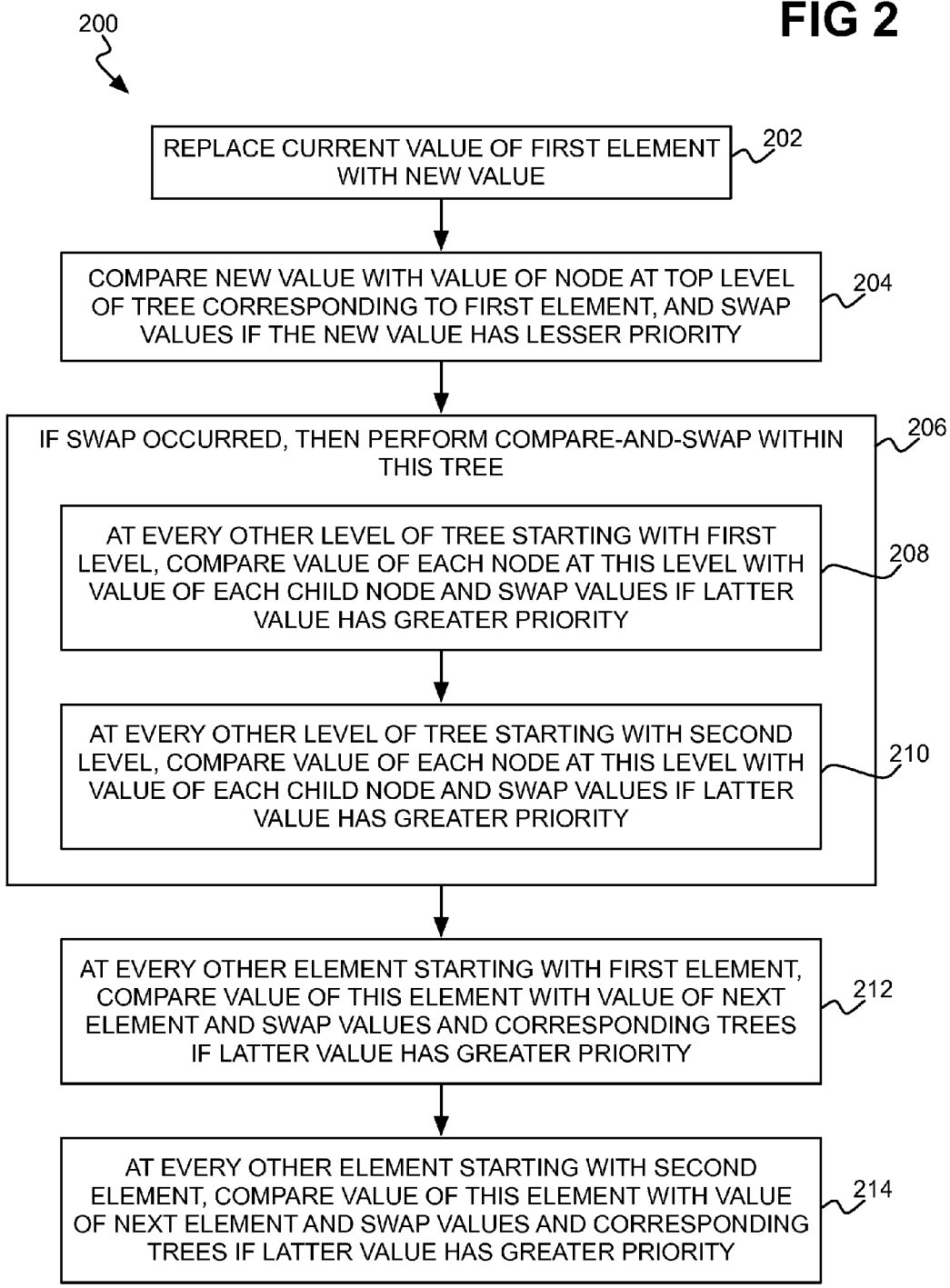
FIG. 2 is a flowchart of an example method for performing a replace operation in relation to a hybrid priority queue.

FIG. 2 shows an example method 200 for performing a replace operation for a hybrid priority queue, such as the queue 100. A replace operation involves dequeuing the value having the greatest priority from the queue, and enqueuing a new value in its place. The method 200 can be implemented by computer-executable code that is executed by a computing device to perform the method 200. The computer-executable code can be stored on a non-transitory computer-readable data storage medium. As one example, the computing device may be an FPGA device, and the code implemented as logic that the FPGA device performs. Example operation of the method 200 is described in relation to the maximum priority queue 100 of FIG. 1, with respect to the new value 324.

Figure 3:
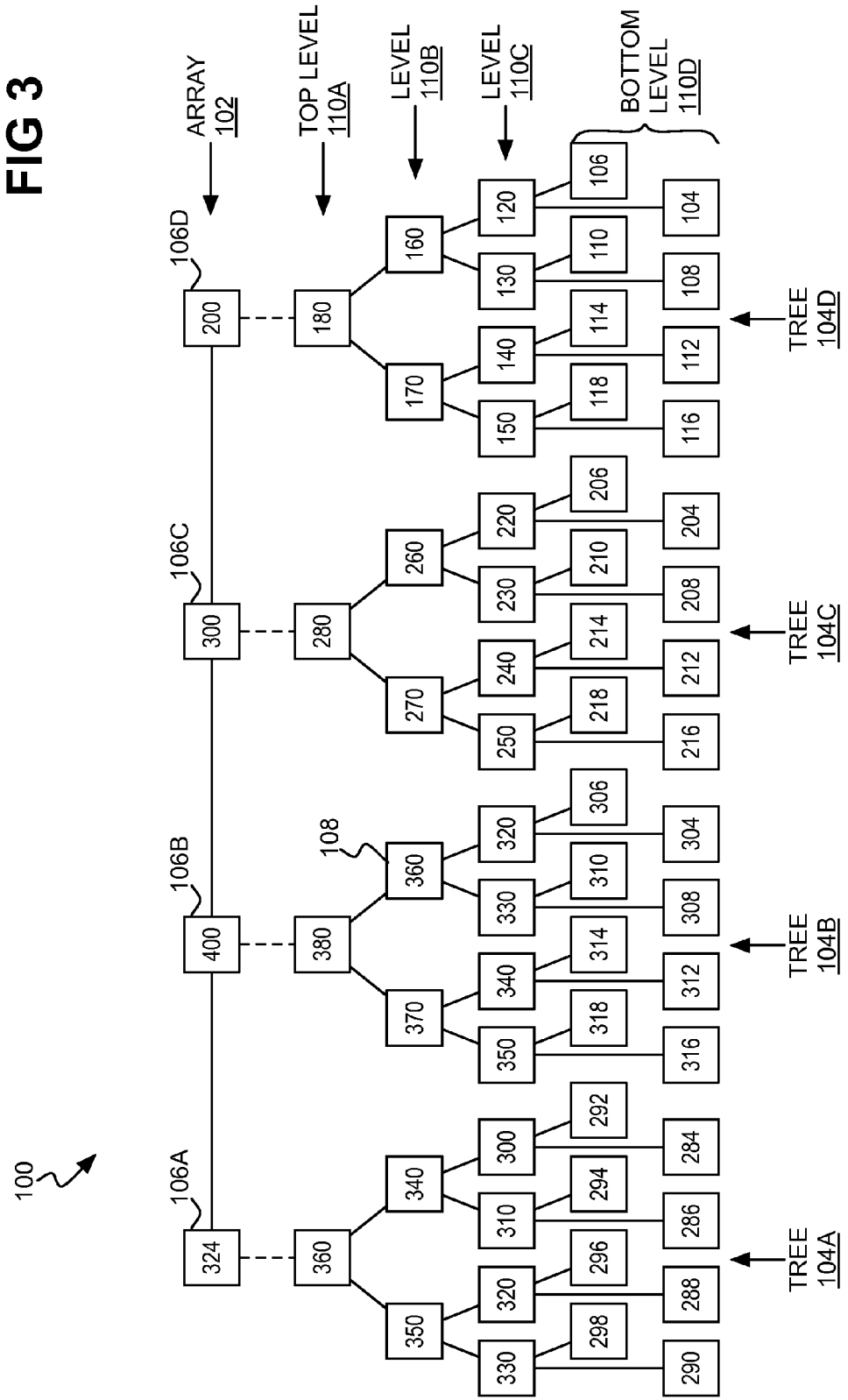
FIGS. 3, 4, 5, 6, and 7 are diagrams of example performance of the method of FIG. 2 in relation to the hybrid priority queue of FIG. 1.

The current value of the first element 106A of the array 102 is replaced with the new value (202). Thus, the value 404 of the first element 106A is returned or provided, and the first element 106A now stores the new value 324. FIG. 3 shows the queue 100 of FIG. 1 after this replacement has occurred. The queue 100 in FIG. 3 is identical to the queue 100 in FIG. 1, except for the first element 106A now storing the new value 324.

Figure 4:
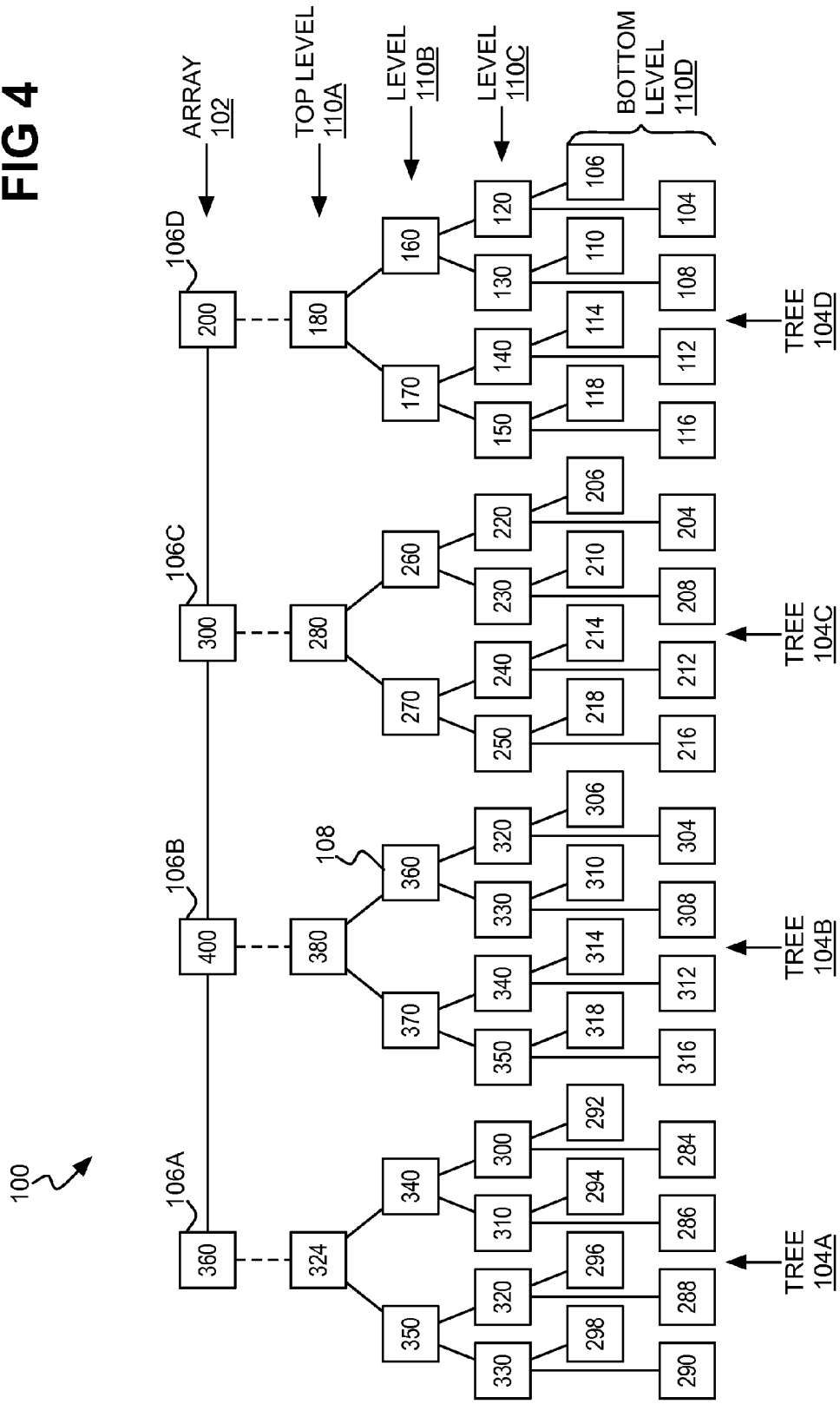

The new value in the first element 106A is then compared with the value of the node 108 at the top level 110A of the tree 104A corresponding to the first element 106A, and if the former value has lesser priority than the latter value, the two values are swapped or switched (204). Thus, the value 324 of the first element 106A is compared with the value 360 of this top level node 108 of the tree 104A. Because the value 324 has lesser priority than the value 360 in a maximum priority queue, the values are swapped, so that the first element 106A stores the value 360 and the top level node 108 of the tree 104A stores the value 324. FIG. 4 shows the queue 100 of FIG. 3 after this swap has occurred. The queue 100 in FIG. 4 is identical to the queue 100 in FIG. 3, except for the first element 106A now storing the value 360 and the top level node 108 of the tree 104A now storing the value 324.

If a swap occurred in part 204, then a compare-and-swap process is performed within the tree 104A that participated in the swap (206). At every other level of the tree 104A starting at the first or top level 110A, the value of each node 108 at the level in question is compared with the value of each of its child nodes (i.e., that are located at the immediately lower level) and the values are swapped or switched if the latter element has greater priority (208). In the queue 100, then, the value of the node 108 at the top level 110A is compared to the values of the nodes 108 within the second level 110B, and the value of each node 108 at the third level 110C is compared to the values of its children nodes within the fourth or bottom level 110D.

Thus as to the queue 100 in FIG. 4, the value 324 of the node 108 at the top level 110A of the tree 104A is compared to the values 350 and 340 of the nodes 108 at the second level 110B of the tree 104A. Because the value 324 has lesser priority than both the values 350 and 340, the value 324 is swapped with one of these values. Thus, the value 324 of the node 108 at the top level 110A of the tree 104A is swapped with the value 350 of the left-most node 108 at the second level 110B of the tree 104A, such that the former node 108 now stores the value 350 and the latter node now stores the value 324.

Furthermore, the value 330 of the first node 108 at the third level 110C of the tree 104A may be compared to the values 290 and 298 of its child nodes 108 at the bottom level 110D of the tree 104A. The value 320 of the second node 108 at the third level 110C of the tree 104A may be similarly compared to the values 288 and 296 of its child nodes 108 at the bottom level 110D of the tree 104A. Likewise, the value 310 of the third node 108 at the third level 110C of the tree 104A may be compared to the values 286 and 294 of its child nodes 108 at the bottom level 110D of the tree 104A, and the value 300 of the fourth node 108 at the third level 110C may be compared to the values 284 and 292 of its child nodes 108 at the bottom level 110D. Because none of these comparisons reveals that any child node has a greater priority than its parent node, no swaps are performed.

It is noted that in one implementation, because the parent nodes 108 of the nodes 108 referenced in this paragraph have not been updated, then this means that the comparisons described in this paragraph are not performed, which provides for even greater performance of the resulting queue 100. Furthermore, in this or another implementation, at any given level 110, just one comparison is performed, because at most one value is updated at a given time. As such, such for a tree 104 having N nodes, just log N compare-and-swap operations are performed in such an implementation.

Figure 5:
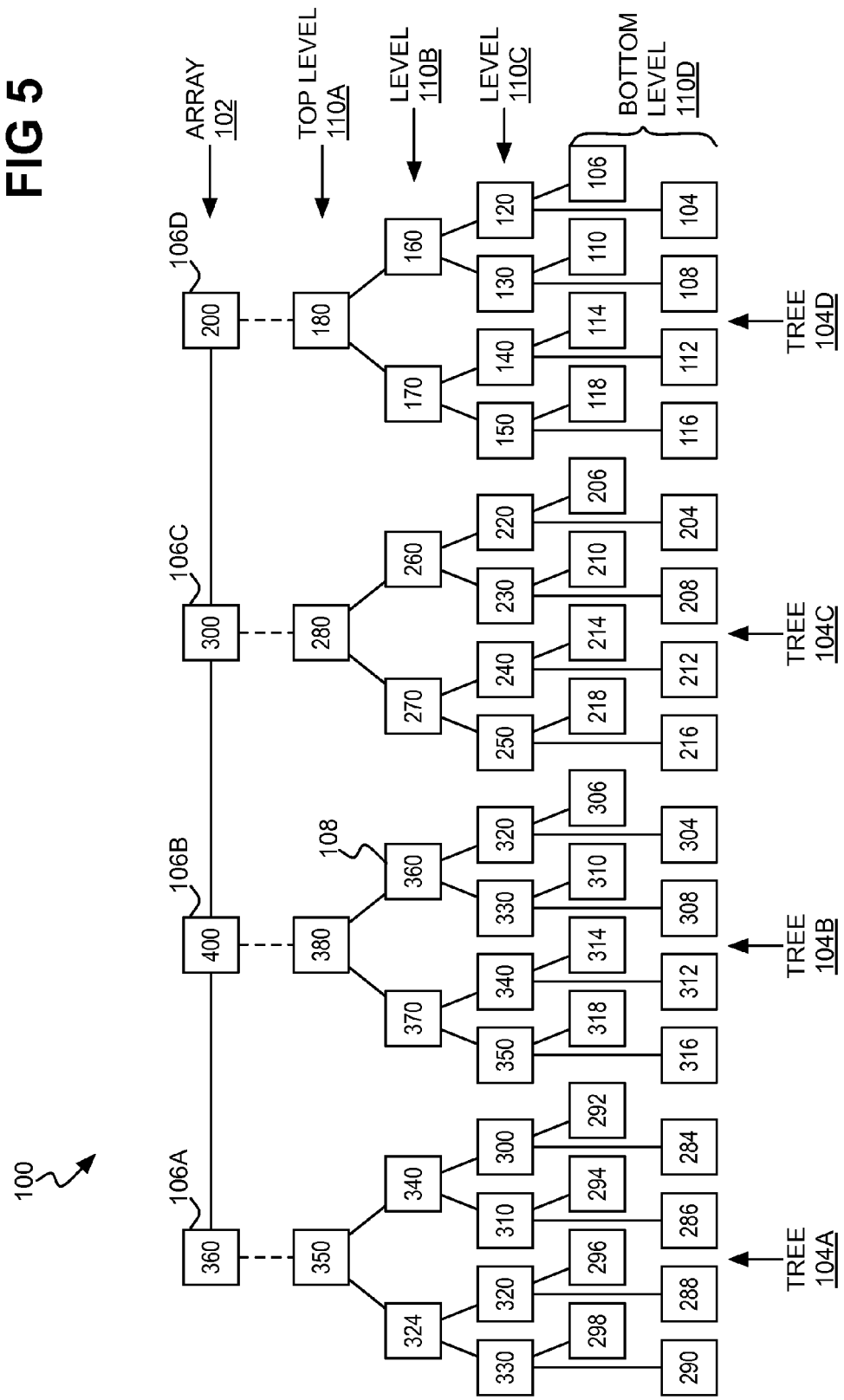

FIG. 5 shows the queue 100 of FIG. 4 after part 208 has been performed. The queue 100 in FIG. 5 is identical to the queue 100 in FIG. 4, except for the node 108 at the top level 110A of the tree 104A now stores the value 350, and the left most node 108 at the second level 110B of the tree 104A now stores the value 324. No swaps were performed between the nodes 108 at the third level 110C and their children nodes 108 at the bottom level 110D, such that the values of the nodes 108 at the levels 110C and 110D are same in FIG. 5 as they were in FIG. 4.

The same type of compare-and-swap operation is then performed for the other levels. That is, at every other level of the tree 104A starting at the second level 110B, the value of each node 108A at the level in question is compared with the value of each of its child nodes and the values are swapped or switched if the latter element has greater priority (210). In the queue 100, then, the value of the left most node 108 at the second level 110B within the tree 104A is compared to the value of each of its children nodes 108 within the third level 110C. The value of the right most node 108 at the second level 110B within the tree 104A may also be compared to the value of its children nodes 108 within the third level 110C, although in one implementation it does not have to be to provide for higher performance of the queue 100, as has been discussed above in relation to part 208. Note that no comparison is performed in relation to the nodes 108 within the bottom level 110D of the tree 104A, because none of these nodes 108 have any children nodes.

Thus, as to the queue in FIG. 5, the value 324 of the left most node 108 at the second level 110B within the tree 104A is compared to the values 330 and 320 of its children nodes 108 within the third level 110C. The value 324 has lesser priority than the value 330 but greater priority than the value 320. Therefore, the value 324 is swapped with the value 330. That is, the left most node 108 at the second level 110B within the tree 104A now stores the value 330, and the left most node 108 at the third level 110C within the tree 104A now stores the value 324. The value 340 of the right most node 108 at the second level 110B within the tree 104A may be similarly compared to the values 310 and 300 of its children nodes within the third level 110C. However, because the value 340 has greater priority than both the values 310 and 300, no swap occurs. Furthermore, in one implementation these comparisons do not occur for improved performance, as has been described above.

Figure 6:
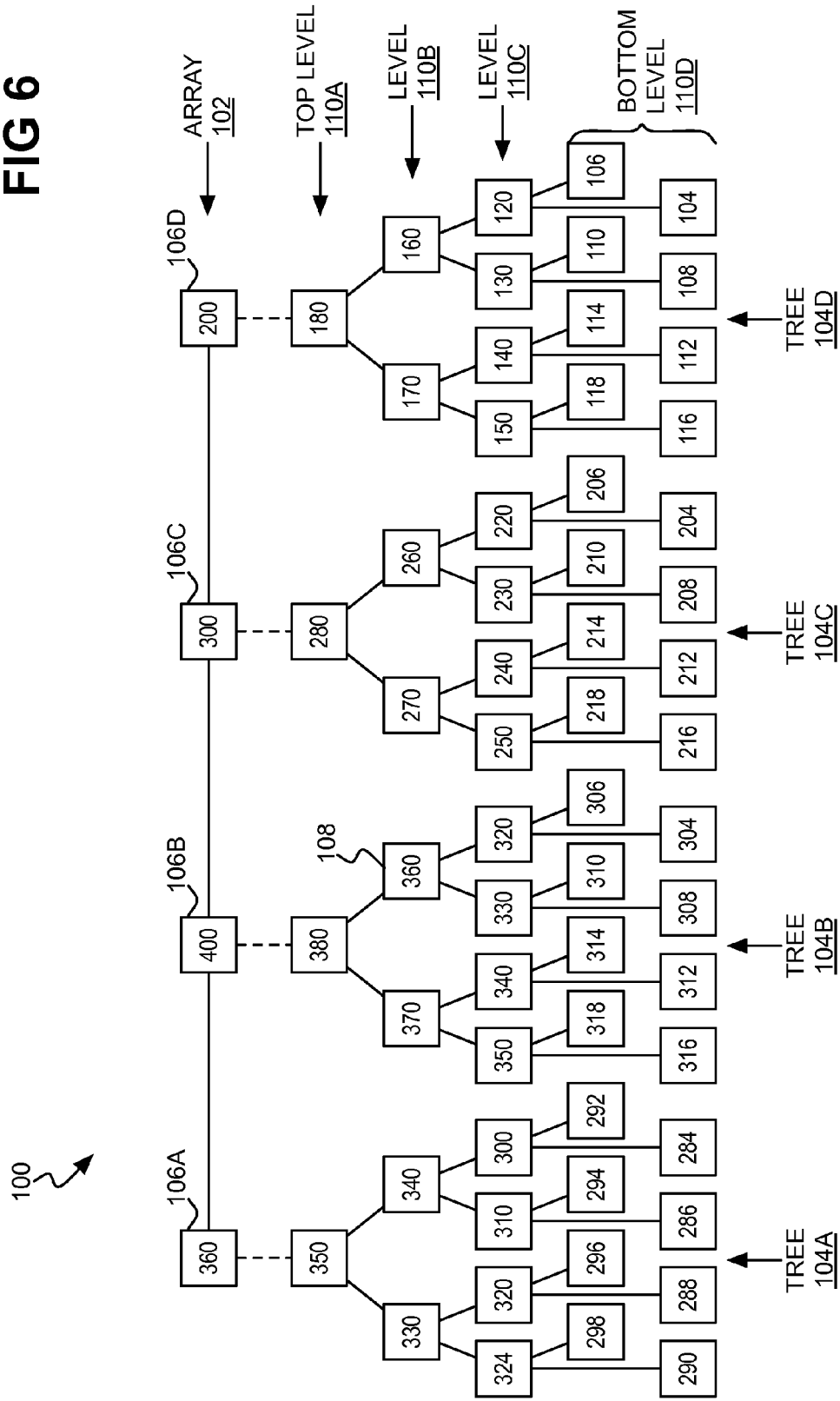

FIG. 6 shows the queue 100 of FIG. 5 after part 210 has been performed. The queue 100 in FIG. 6 is identical to the queue 100 in FIG. 5, except for the left most nodes 108 at the levels 110B and 110C within the tree 104A. Specifically, the left most node 108 at the level 110B now stores the value 330, and the left most node 108 at the level 110C now stores the value 324. No swaps were performed—and in one implementation no comparisons are performed—between the right most node 108 at the level 110B and its two children nodes within the third level 110C.

In parallel with the compare-and-swap process of part 206, at every other element 106 in the array 102 starting with the first element 106A, the value of each such element 106 is compared with the value of its next or immediately successive element 106, and the values and the elements' corresponding trees 104 are swapped or switched if the latter value has greater priority (212). In the queue 100, then, the value of the element 106A is compared to the value of the element 106B, and the two values and the trees 104A and 104B are swapped if the value of the element 106B has greater priority. Likewise, the value of the element 106C is compared to the value of the element 106D, and the two values and the trees 104C and 104D are swapped if the value of the element 106D has greater priority.

Thus as to the queue 100 in FIG. 6, the value 360 of the element 106A is compared to the value 400 of the element 106B. Because the value 360 has greater priority than the value 400, the values 360 and 400 are swapped, and the trees 104A and 104B are swapped. The value 300 of the element 106C is likewise compared to the value 200 of the element 106D. Because the value 200 has lesser priority than the value 300, the values 200 and 300 are not swapped, and the trees 104C and 104D are not swapped.

Figure 7:
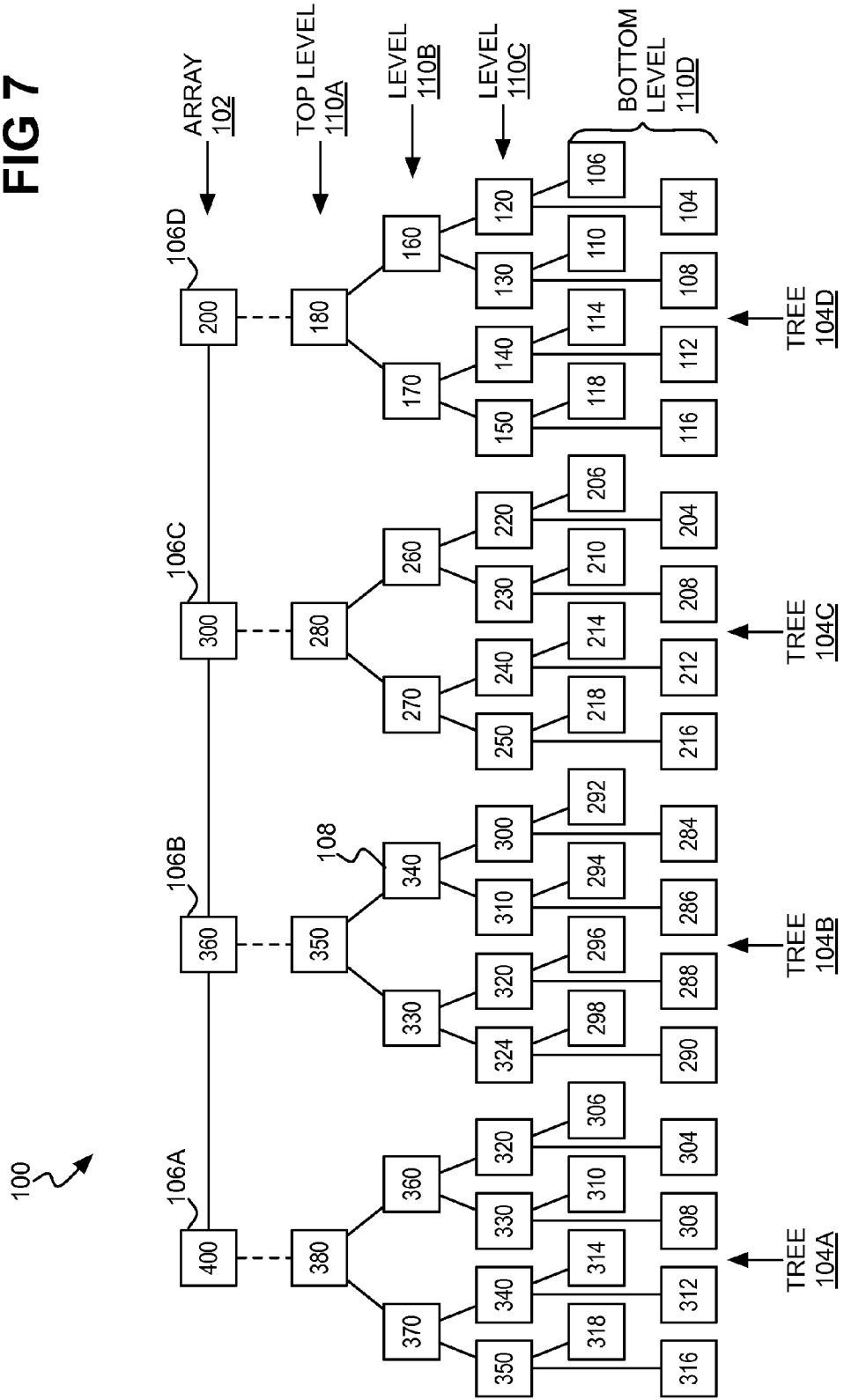

FIG. 7 shows the queue 100 of FIG. 6 after part 212 has been performed. As to the array 102, the queue 100 is identical in FIGS. 6 and 7, except for in FIG. 7, the first element 106A now stores the value 400 and the second element 106B now stores the value 360. As to the trees 104, the queue 100 is identical in FIGS. 6 and 7, except for the trees 104A and 104B have been swapped between FIGS. 6 and 7. That is, the tree 104A in FIG. 7 is identical to the tree 104B in FIG. 6, and the tree 104B in FIG. 7 is identical to the tree 104A in FIG. 6.

The same type of compare-and-swap operation is then performed for the other elements. That is, at every other element 106 in the array 102 starting with the second element 106B, the value of each such element 106 is compared with the value of its next element 106, and the values and the elements' corresponding trees 104 are swapped or switched if the latter value has greater priority (214). In the queue 100, then, the value of the element 106B is compared to the value of the element 106C, and the two values and the trees 104B and 104C are swapped if the value of the element 106C has greater priority. Note that no comparison is performed for the element 106D, because the element 106D is the last element and does not have any succeeding or next element.

Thus as to the queue 100 in FIG. 7, the value 360 of the element 106B is compared to the value 300 of the element 106C. Because the value 300 has lesser priority than the value 360, however, the values 300 and 360 are not swapped, nor are the trees 104B and 104C. Therefore, as to the example maximum priority queue 100 that has been described, the queue 100 of FIG. 7 represents the queue's new steady state, until another replace operation is performed.

In general, when a replace operation is performed in accordance with the method 200, compare-and-swap processes are at most performed just in relation to the array 102, and/or the left-most tree 104A. Compare-and-swap processes are not performed in relation to any other tree 104. This ensures for greater performance of such operations as to the hybrid priority queue 100 and comparable to that for an array-only priority queue. Furthermore, the hybrid nature of the priority queue 100 permits a larger number of values to be stored within the hybrid priority queue 100 implemented as an FPGA device as compared to an array-only priority queue implemented as an FPGA device.

Figure 8:
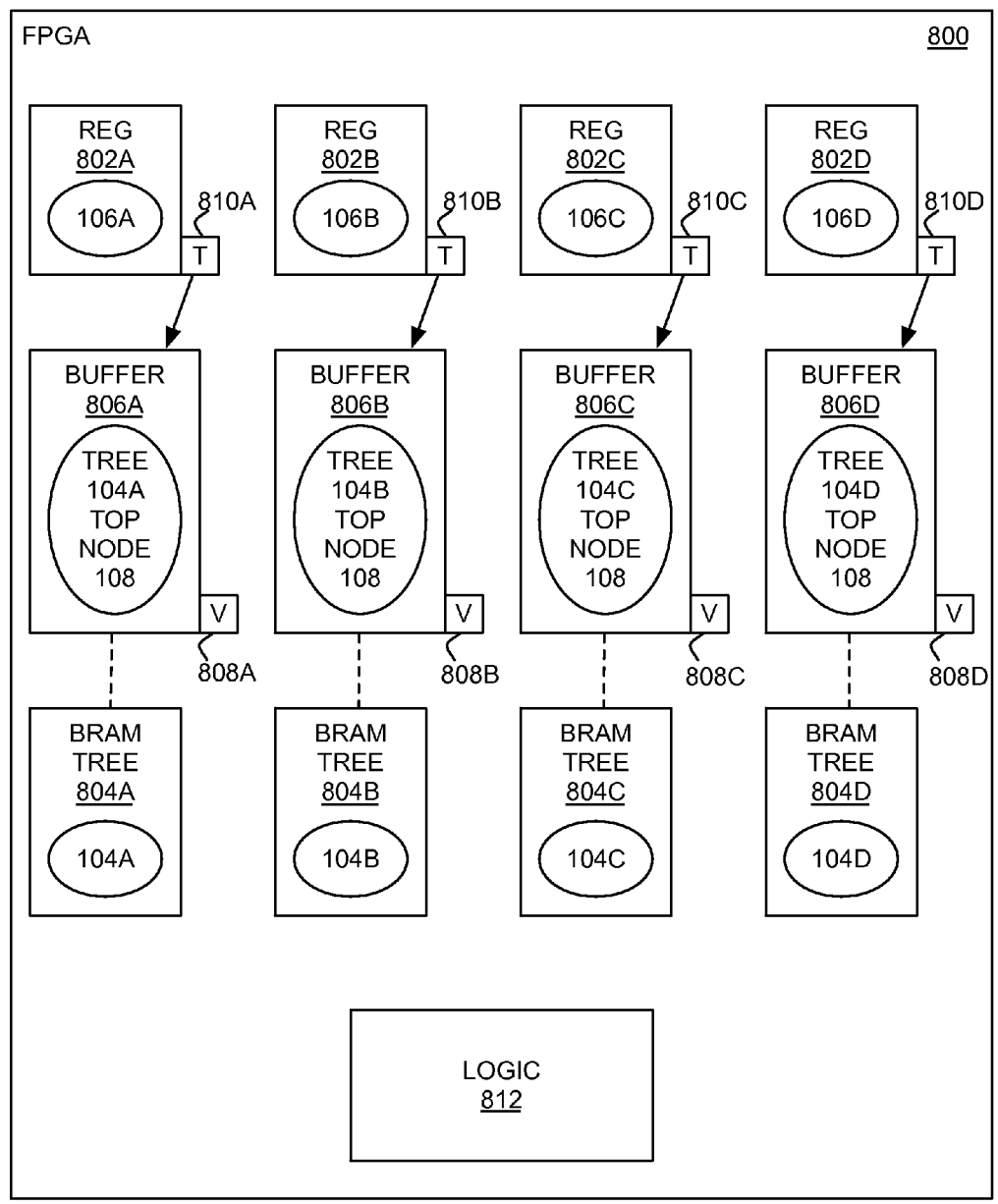
FIG. 8 is a diagram of an example field programmable gate array (FPGA) implementation of the hybrid priority queue of FIG. 1.

FIG. 8 shows an example FPGA device 800 implementing the hybrid priority queue 100 that has been described. The array elements 106 are implemented by registers 802A, 802B, 802C, and 802D, which are collectively referred to as the registers 802. The trees 104 are implemented by BRAM trees 804A, 804B, 804C, and 804D, which are collectively referred to as the BRAM trees 804. A BRAM tree is an implementation of a logical tree using BRAM, in which at each level there is an index indicating which value in the BRAM has been displaced. A compare-and-swap is performed by reading the index and then calculating the index of the two child values in the next level. A BRAM tree is more scalable than a logical tree implemented via registers, for instance.

So that the array elements 106 within the registers 802 can be compared with the top-level nodes 108 of the trees 104 that are implemented by the BRAM trees 804 without having to communicate directly with BRAM, the FPGA device 800 can include buffers 806A, 806B, 806C, and 804D, collectively referred to as the buffers 806. The buffers 806 buffer the top level nodes 108 of the trees 104, respectively. Further, the buffers 806 can have validity flags 808A, 808B, 808C, and 808D, respectively, which are collectively referred to as the validity flags 808, and which indicate whether the buffers 806 are valid or invalid.

A buffer 806 is valid when it is at steady state, such it has a value larger than the values of the nodes 108 in the tree 104 to which the buffer 806 corresponds (except for the top-level node 108 that the buffer 806 buffers). A buffer 806 is invalid when it is not at steady state, such that it does not yet have a value larger than the values of the nodes 108 in the tree 104 to which the buffer 806 (except for the top-level node to which the buffer 806 corresponds). This is helpful, because when compare-and-swap operations are still being performed in relation to the tree 104 to which a buffer 806 corresponds, compare-and-swap operations between the array elements 106 and the top level nodes 108 of the trees 104, should be stalled and wait for the buffer 806 in question to reach a steady state.

The FPGA device 800 can include tags 810A, 810B, 810C, and 810D, collectively referred to as the tags 810, and corresponding to the registers 802. The tags 810 each identify which tree 104 a corresponding register 802 is associated with via a pointer to the buffer 806 caching the top level node 108 of that tree 104. As described above in relation to the method 100, trees 104 are swapped for two elements 106 when the values of the elements 106 are themselves swapped. Rather than swapping each pair of corresponding elements between two such trees 104, the values of the tags 810 just have to be swapped, which is more efficient from a performance perspective.

The FPGA device 800 includes logic 812. The logic 812 implements or otherwise stores computer-executable code to perform the method 200 that has been described. As such, the FPGA device 800 is special-purpose hardware for implementing the hybrid priority queue 100. Because the FPGA device 800 is special purpose and not general purpose, the priority queue 100 has better performance than if implemented using a general-purpose processor and general-purpose memory. Similarly, because the priority queue 100 is a hybrid priority queue as has been described, the queue 100 also has better performance and better scalability as to size than a non-hybrid priority queue.

We claim:

1. A field programmable gate array (FPGA) device comprising:
   a priority queue comprising:
      a plurality of block random-access memory (BRAM) trees to implement a plurality of trees, each tree having a plurality of nodes organized over a plurality of levels from a top level to a bottom level, each level of each tree having a number of nodes greater than any preceding level;
      a register to implement an array having a plurality of elements ordered from a first element to a last element, each element corresponding to one of the trees; and
      logic to:
         effect a replace operation in relation to the trees and the array so that the first element stores a value that has a greatest priority of any value stored in any element and in any node of any tree;
         replace a current value of the first element with a new value; and
         compare the new value of the first element with a value of an immediately successive element, and, where the value of the immediately successive element has greater priority, switch the new value and the value of the immediately successive element and switch the tree corresponding to the element having the new value and the tree corresponding to the element having the value of the immediately successive element.

2. The priority queue of claim 1, wherein responsive to the replace operation, the logic is further to:
   compare the new value with a value of a node at the top level of the tree corresponding to the first element; and
   in response to determining that the new value has lesser priority than the value of the node at the top level of the tree corresponding to the first element, switch the new value of the first element and the value of the node at the top level of the tree corresponding to the first element.

3. The priority queue of claim 2, wherein responsive to the replace operation, the logic is further to:
   at each level of every other level of the tree corresponding to the first element, starting at the first level, compare a first value of each node at the level with a second value of each node at an immediately lower level and switch the first value and the second value where the second value has greater priority; and
   at each level of every other level of the tree corresponding to the first element, starting at the level immediately below the first level, compare a third value of each node at the level with a fourth value of each node at an immediately lower level and switch the third value and the fourth value where the fourth value has greater priority.

4. The priority queue of claim 2, wherein responsive to the replace operation, the logic is further to:
   at each element of every other element, starting at the element immediately succeeding the first element, compare a third value of the element with a fourth value of an immediately successive element and, where the fourth value has greater priority, switch the third value and the fourth value and switch the tree corresponding to the element having the third value and the tree corresponding to the element having the fourth value.

5. The priority queue of claim 1, further comprising:
   a buffer to buffer the node at the top level of each tree so that a value of the node at the top level of each tree is accessible without having to access the tree directly; and
   a flag for each buffer to indicate whether the tree buffer is valid, corresponding to the buffer having a largest value of any node within the tree that corresponds to the buffer except for the node at the top level, or invalid, corresponding to the buffer not having the largest value of any node within the tree that corresponds to the buffer except for the node at the top level.

6. The priority queue of claim 1, wherein the priority queue is one of:
   a maximum priority queue, such that a first value has greater priority than a second value when the first value is greater than the second value; and
   a minimum priority queue, such that the first value has greater priority than the second value when the first value is lesser than the second value.

7. A method comprising:
   replacing with a new value, by a computing device, a current value of a first element of an array having a plurality of elements that are ordered, each element corresponding to a tree having a plurality of nodes organized over a plurality of levels that are ordered, each level of each tree having a number of nodes greater than any preceding level;
   comparing, by the computing device, the new value with a value of the node at a top level of the tree corresponding to the first element; and
   in response to determining that the new value has lesser priority than the value of the node at the top level of the tree corresponding to the first element, swapping, by the computing device, the new value of the first element for the value of the node at the top level of the tree corresponding to the first element;
   comparing, by the computing device, a first value of a node at the first level with a second value of a node at a level below the first level;
   swapping, by the computing device, the first value with the second value where the second value has greater priority than the first value;
   comparing, by the computing device, a third value of a node at the level below the first level with a fourth value of a node at a level below the level below the first level; and
   swapping, by the computing device, the third value with the fourth value where the fourth value has greater priority than the third value.

8. The method of claim 7, further comprising:
   at each element of every other element, starting at the first element, comparing, by the computing device, a fifth value of the element with a sixth value of a next element; and
   at each element of every other element, starting at the first element, where the sixth value has greater priority than the fifth value, swapping, by the computing device, the fifth value with the sixth value, and the tree corresponding to the element having the fifth value with the tree corresponding to the element having the sixth value.

9. The method of claim 8, further comprising:
at each element of every other element, starting at the element next to the first element, comparing, by the computing device, a seventh value of the element with an eighth value of an immediately successive element; and
at each element of every other element, starting at the element next to the first element, where the eighth value has greater priority than the seventh value, swapping, by the computing device, the seventh value with the eighth value, and the tree corresponding to the element having the seventh value with the tree corresponding to the element having the eighth value.

10. A non-transitory computer-readable data storage medium storing computer-executable code that when executed by a computing device causes the computing device to:
perform a replace operation in relation to a priority queue having a plurality of trees and a plurality of elements, so that a first element of the plurality stores a value having a greatest priority of any value stored in any element and in any tree,
wherein each tree corresponds to one of the elements and is manipulated when a greatest priority value stored in the tree has greater priority than a value stored in the one of the elements;
wherein each tree has a plurality of levels from a top level including one node to a bottom level, each level of each tree has a number of nodes greater than any preceding level, and where the computing device is to perform the replace operation by:
replacing with a new value a current value of the first element;
comparing the new value with a value of a node at a top level of the tree corresponding to the first element;
in response to determining that the new value has lesser priority than the value of the node at the top level of the tree corresponding to the first element, swapping the new value of the first element for the value of the node at the top level of the tree corresponding to the first element;
at each level of every other level of the tree corresponding to the first element, starting at the first level, comparing a first value of each node at the level with a second value of each node at a next lower level; and
at each level of every other level of the tree corresponding to the first element, starting at the first level, swapping the first value with the second value where the second value has greater priority than the first value;
at each level of every other level of the tree corresponding to the first element, starting at the level below the first level, comparing a third value of each node at the level with a fourth value of each node at a next lower level;
at each level of every other level of the tree corresponding to the first element, starting at the level below the first level, swapping the third value with the fourth value where the fourth value has greater priority than the third value.

11. The non-transitory computer-readable data storage medium of claim 10, wherein the computing device is to further perform the replace operation by:
at each element of every other element, starting at the first element, comparing a fifth value of the element with a sixth value of a next element; and
at each element of every other element, starting at the first element, where the sixth value has greater priority than the fifth value, swapping the fifth value with the sixth value, and the tree corresponding to the element having the fifth value with the tree corresponding to the element having the sixth value.

* * * * *